United States Patent Office 2,740,623
Patented Apr. 3, 1956

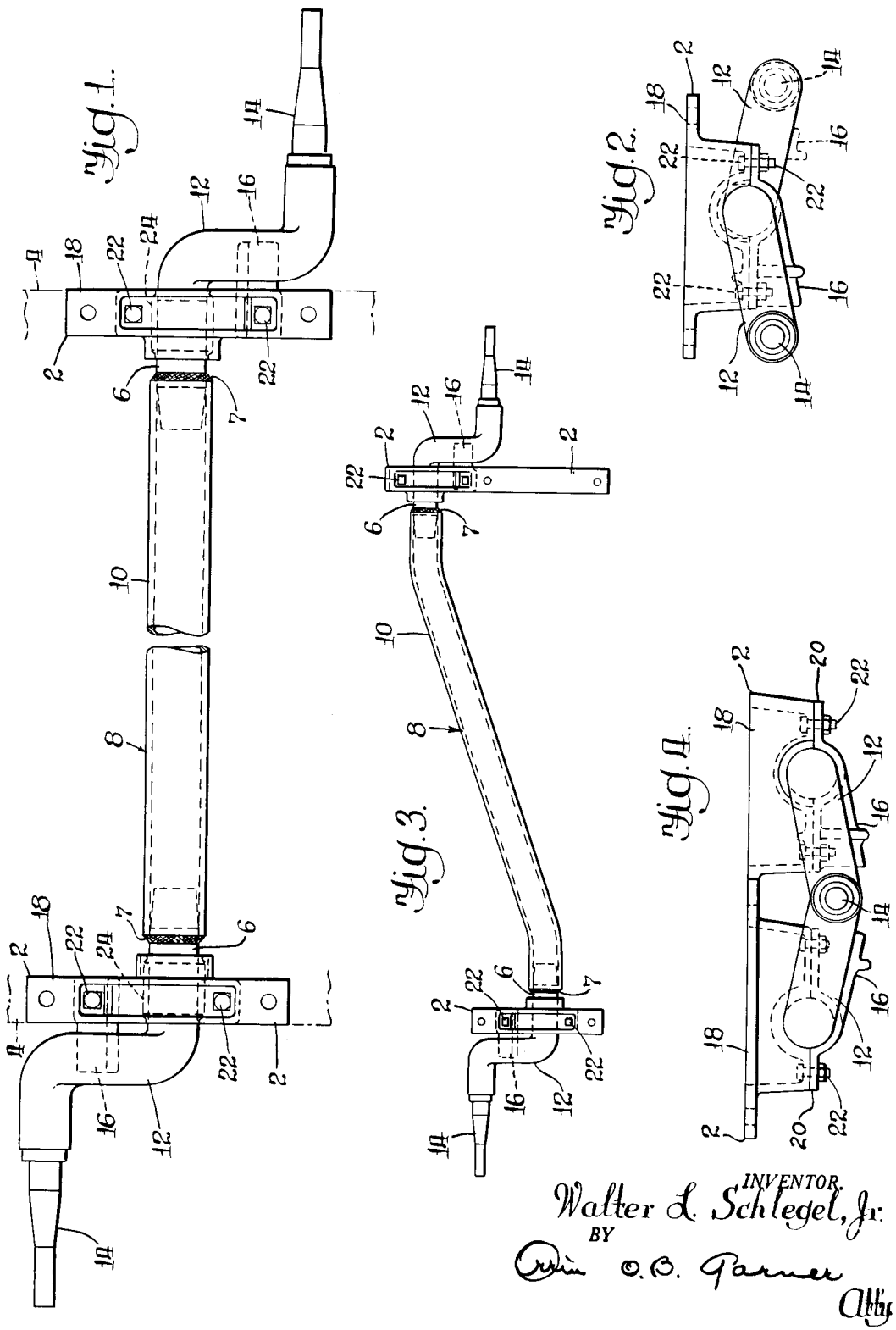

2,740,623

AXLE ASSEMBLY

Walter L. Schlegel, Jr., Chicago, Ill., assignor to American Steel Foundries, Chicago, Ill., a corporation of New Jersey Application January 23, 1952, Serial No. 267,862

3 Claims. (Cl. 267—57)

This invention relates to a wheel and axle assembly for trailers and has for an object the provision of an assembly of this type which is relatively simple and inexpensive in construction and adapted to resiliently support a trailer body.

Wheel and axle assemblies heretofore provided for use on trailers have commonly employed the use of springs interposed between the axle and trailer body to resiliently support the latter. Other types of assemblies have embodied helical springs sleeved over an axle to yieldably resist rotation of the latter to thus permit relative vertical movement between the wheels and the trailer body supported thereon. As the use of springs in the assembly adds to the cost thereof and as springs are subject to breakage in use, the present invention contemplates the provision of a wheel and axle assembly adapted to resiliently support a trailer body without employing the use of springs.

Briefly, the present invention comprises an axle journaled adjacent its ends in a pair of bearing brackets secured to or integral with a trailer body, each end of the axle having a laterally projecting crank arm carrying a wheel supporting spindle. By disposing the crank arms and their respective wheel spindles on opposite sides of the axle, relative rotation of the crank arms is yieldably resisted by the axle.

This invention further contemplates the provision of a wheel and axle assembly in which stop arms are provided on the bearing brackets to limit rotational movement of their respective crank arms in a downward direction, each crank arm being movable upwardly through an arc of approximately 90° depending upon the load forces transmitted thereto from the trailer body.

This invention further contemplates the provision of a wheel and axle assembly in which the journal portions of the axle have a common axis, and the crank arms are normally disposed to diverge downwardly from said axis.

This invention further contemplates the provision of a wheel and axle assembly in which the wheel supporting spindles are disposed on a common axis, and the crank arms diverge upwardly from their respective spindles, the crank arms being interconnected by a diagonally disposed axle.

This invention further contemplates the provision of an axle including spaced journal portions and an intermediate torsion portion, the latter portion being formed of tubular metal welded at its ends to the journal portions.

This invention embodies other novel features, details of construction and arrangement of parts which are hereinafter set forth in the specification and claims and illustrated in the accompanying drawing, wherein:

Figure 1 is a top plan view illustrating an axle assembly embodying features of the present invention;

Figure 2 is an end elevational view of same;

Figure 3 is a top plan view illustrating a modified form of the invention, and

Figure 4 is an end elevational view of same.

Referring now to the drawing for a better understanding of the present invention and more particularly to Figures 1 and 2 therein, the axle assembly is shown as comprising a pair of bearing brackets 2—2 adapted to be bolted or otherwise secured to the bottom of a trailer body 4 or integral therewith, to receive the journal portions 6—6 of an axle indicated generally at 8. The inboard end of each journal portion 6 is inserted into and welded at 7 to the adjacent end of a resilient metal tubing 10, and a crank arm 12 is provided on the outboard end of each journal portion to support a wheel spindle 14.

As illustrated in Figure 2 the crank arms 12—12 diverge downwardly from opposite sides of the axis of the journal portions 6—6 and normally rest against stop arms 16—16 provided on adjacent bearing brackets 2—2. The wheel spindles are thus normally disposed in a common plane below the axis of the journal portions and in parallel relation thereto to rotatably support a pair of wheels (not shown).

Each bearing bracket 2 preferably comprises an upper section 18 and a lower section 20 secured together by means of bolts 22—22 to house a semi-cylindrical bushing 24 serving as a bearing for its related journal portion. Each stop arm 16 is preferably cast integral with its related lower section 20. While each journal portion and its related crank arm and wheel spindle are illustrated in the form of a one-piece steel forging, it is apparent that they could be formed as individual pieces and welded together, if desired.

During use of the wheel and axle assembly in resiliently supporting a trailer body, the crank arms 12—12 are normally urged into engagement with their respective stop arms 16—16 and swing upwardly about the axis of the journal portions 6—6 responsive to load forces acting downwardly on the assembly and against the torque resistance offered by the resilient metal sleeve 10. By removing the load from the trailer, the sleeve acts to return the crank arms to their normal position in engagement with their respective stop arms. It will also be noted that each crank arm is free to swing upwardly while its companion crank arm rests against its stop arm.

Figures 3 and 4 illustrate a modified form of the invention embodying the same parts as the form illustrated in Figures 1 and 2 and, therefore, corresponding members have been applied to similar parts. In this form of the invention the bearing brackets 2—2 are bolted to the trailer body to dispose the axes of the journal portions 6—6 in parallel relation with and on opposite sides of the wheel spindles 14—14 which are coaxial in their normal position against their respective stop arms 16—16. The resilient metal sleeve 10 extends diagonally between and is welded at its ends to the inboard ends of the journal portions 6—6 and acts as a torque bar to yieldably resist upward swinging movement of either one or both crank arms.

While this invention has been shown in but two forms it is obvious to those skilled in the art that it is not so limited but is susceptible of various changes and modifications without departing from the spirit and scope of the claimed invention.

I claim:

1. In an axle assembly for a trailer body, spaced bearings attached to the trailer body, cranks comprising journal portions rotatably mounted in their respective bearings, arms offset laterally and normally inclined downwardly in opposite directions from their respective journal portions, wheel spindles provided on the free ends of their respective arms and having their axes substantially parallel to the axes of said journal portions, a resilient member extending continuously between said journal portions and having its ends connected to the inboard ends of respective journal portions and secured thereto to yieldably resist relative rotational movement of said portions, and fixed stops carried by respective bearings normally disposed in abutting engagement against the lower sides of respective arms to limit downward movement of the arms, whereby upon upward movement of one arm a torque load is transmitted therefrom through the resilient sleeve to the companion arm and its associated stop, said resilient member being torsionally prestressed to urge said arms against respective stops.

2. In an axle assembly for a trailer body, spaced bearings attached to the trailer body, cranks comprising journal portions rotatably mounted in their respective bearings, arms offset laterally and normally inclined downwardly in opposite directions from their respective journal portions, wheel spindles provided on the free ends of their respective arms and having their axes substantially parallel to the axes of said journal portions, a resilient metallic sleeve extending continuously between said journal portions and having its ends telescopically engaged over the inboard ends of the journal portions and secured thereto to yieldably resist relative rotational movement of said portions, and fixed stops carried by respective bearings normally disposed in abutting engagement against the lower sides of their respective arms to limit downward movement of the arms, whereby upon upward movement of one arm a torque load is transmitted therefrom through the resilient sleeve to the companion arm and its associated stop, said resilient sleeve being torsionally prestressed to urge said arms against respective stops, and said wheel spindles being substantially coaxial when said arms are engaged with their respective stops.

3. In an axle assembly for a vehicle, spaced bearings attached to said vehicle, cranks comprising journal portions rotatably mounted in respective bearings, crank arms offset in opposite directions from their respective journal portions, wheel spindles on respective arms, said spindles having axes substantially parallel to the axes of the journal portions, a resilient member extending continuously between said journal portions and connected thereto to resiliently resist relative rotational movement of said portions, fixed stops carried by respective bearings for engagement with the underside of respective arms, whereby upon upward movement of one arm a torque load is transmitted therefrom through the resilient sleeve to the companion arm and its associated stop, said resilient member being torsionally prestressed to urge said arms against respective stops, and said wheel spindles being substantially coaxial when said arms are engaged against their respective stops.

References Cited in the file of this patent

UNITED STATES PATENTS

| | | |
|---|---|---|
| 326,284 | Forbes | Sept. 15, 1885 |
| 2,060,015 | Barnes et al. | Nov. 10, 1936 |
| 2,404,121 | Black | July 16, 1946 |
| 2,565,756 | Coleman | Aug. 28, 1951 |
| 2,653,828 | Alley | Sept. 29, 1953 |

FOREIGN PATENTS

| | | |
|---|---|---|
| 146,237 | Austria | June 25, 1936 |
| 462,600 | Canada | Jan. 24, 1950 |
| 719,162 | Germany | Mar. 31, 1942 |
| 342,649 | France | July 13, 1904 |
| 872,258 | France | Feb. 5, 1942 |